(12) United States Patent
Yagi et al.

(10) Patent No.: US 7,049,948 B2
(45) Date of Patent: May 23, 2006

(54) TIRE PRESSURE MONITORING SYSTEM

(75) Inventors: Daisuke Yagi, Shizuoka (JP); Tatsuya Ishikawa, Shizuoka (JP); Masaya Sugita, Shizuoka (JP)

(73) Assignee: YAZAKI Corporation, Tokyo (JP)

( * ) Notice: Subject to any disclaimer, the term of this patent is extended or adjusted under 35 U.S.C. 154(b) by 194 days.

(21) Appl. No.: 10/830,395

(22) Filed: Apr. 23, 2004

(65) Prior Publication Data

US 2004/0212487 A1   Oct. 28, 2004

(30) Foreign Application Priority Data

Apr. 25, 2003   (JP) .............................. 2003-122784

(51) Int. Cl.
*B60C 23/00* (2006.01)
(52) U.S. Cl. ........................ 340/442; 340/444; 340/447
(58) Field of Classification Search ................ 340/442, 340/443, 444, 445, 447, 438; 70/146; 73/146.2, 73/146.5

See application file for complete search history.

(56) References Cited

U.S. PATENT DOCUMENTS

| | | | | |
|---|---|---|---|---|
| 6,748,797 | B1 * | 6/2004 | Breed et al. ................... | 73/146 |
| 6,778,075 | B1 * | 8/2004 | Headley et al. ............. | 340/443 |
| 6,954,688 | B1 * | 10/2005 | Katou .......................... | 701/29 |
| 6,958,686 | B1 * | 10/2005 | Okubo ........................ | 340/447 |

FOREIGN PATENT DOCUMENTS

JP   09-175124   7/1997

* cited by examiner

*Primary Examiner*—Toan N. Pham
(74) *Attorney, Agent, or Firm*—Finnegan, Henderson, Farabow, Garrett & Dunner, L.L.P.

(57) ABSTRACT

A tire pressure monitoring system includes an on-board detection unit configured to transmit a detection signal indicative of the presence of an occupant entering a vehicle, a vehicle-body-based unit configured to receive the detection signal and transmit a transmission request to receive at least one air pressure signal indicative of tire pressure of the vehicle, and at least one tire-based unit configured to receive the transmission request, measure the tire pressure and transmit the air pressure signal.

14 Claims, 9 Drawing Sheets

TIRE PRESSURE MONITORING SYSTEM

CROSS REFERENCE TO RELATED APPLICATIONS

This application is based upon and claims the benefit of priority from the prior Japanese Patent Applications No. P2003-122784, filed on Apr. 25, 2003; the entire contents of which are incorporated herein by reference.

BACKGROUND OF THE INVENTION

1. Field of the Invention

The present invention relates to a tire pressure monitoring system that measures vehicle tire pressures and notifies an occupant of the resulting status.

2. Description of the Related Art

To aid in vehicle running safety, a tire pressure monitoring system (TPMS: The Pressure Monitoring System) is known which measures tire pressures of the vehicle to allow the pressure status to be indicated to an occupant of the vehicle. With the tire pressure monitoring system of this kind, it is desired for a vehicle occupant to be reliably notified of the tire pressure status in the occurrence of an abnormality in tire pressure and conserve power consumption. Various proposals have heretofore been made in the past to provide technologies such as those disclosed in Japanese Patent Provisional Publication No. 9-175124.

Technology disclosed in Japanese Patent Provisional Publication No. 9-175124 contemplates to set a low power consumption mode in a normal state to allow signals to be transferred or received at given time intervals for checking a system. When an abnormality occurs in the tire pressure, the low power consumption mode is cancelled so as to enable a signal indicative of the abnormal tire pressure to be transmitted or received and notify a vehicle occupant. This notification provides a capability of rapidly and reliably notifying the occupant of an abnormality in tire pressure while suppressing power consumption to a minimal during a period when no abnormal tire pressure occurs in tire pressure.

However, the technology mentioned above is premised on a fact that when an abnormality in air pressure is detected and a signal indicative of the abnormality is transmitted, a receiver circuit mounted on-board the vehicle for receiving the resulting signal remains in an operative condition. Such a system is effective for a running (moving) vehicle which is adapted to supply electric power to the receiver circuit at all times. In contrast, considering that the receiver circuit is turned off during, for instance, parking of the vehicle, the receiver circuit on-board the vehicle is disenabled and cannot receive the resulting signal even when the resulting signal, indicative of an abnormal tire pressure, is rapidly transmitted from the relevant tire, resulting in useless operation in transmitting the resulting signal from the abnormally inflated/deflated tire.

SUMMARY OF THE INVENTION

An aspect of the present invention inheres in a tire pressure monitoring system including an on-board detection unit configured to transmit a detection signal indicative of the presence of an occupant entering a vehicle, a vehicle-body-based unit configured to receive the detection signal and transmit a transmission request to receive at least one air pressure signal indicative of vehicle tire pressure, and at least one tire-based unit configured to receive the transmission request, measure the tire pressure and transmit the air pressure signal.

DESCRIPTION OF THE PREFERRED EMBODIMENTS

Before describing a concrete embodiment of the present invention, first, an outline of a tire pressure monitoring system (TPMS: Tire Pressure Monitoring System) to which the present invention is applied is briefly described with reference to FIG. 1.

Figure 1:
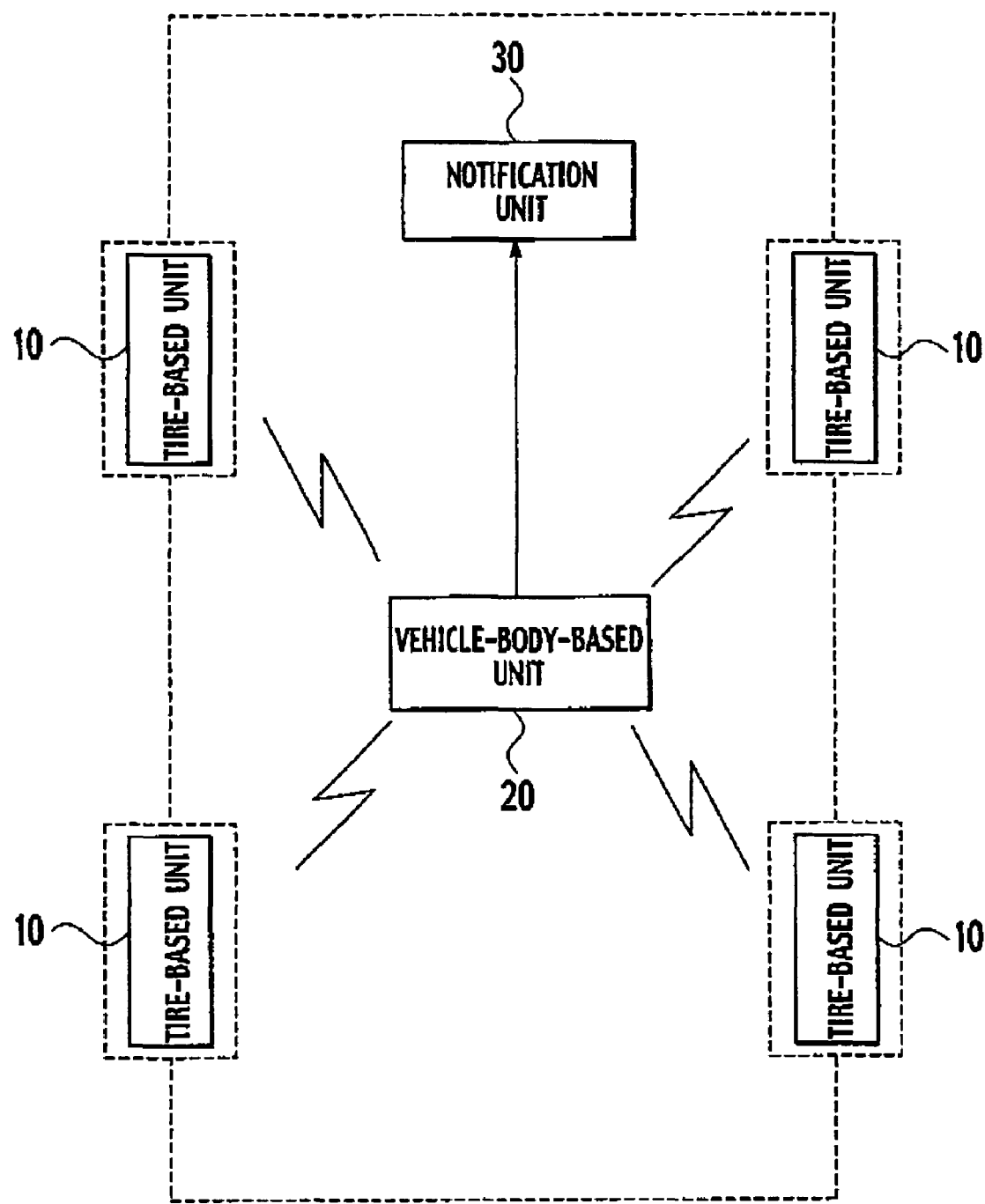
FIG. 1 is a block diagram schematically showing the tire pressure monitoring system

As shown in FIG. 1, the tire pressure monitoring system includes tire-based units 10 mounted in, for example, four tires, such as left and right and fore and aft wheels of a vehicle, respectively, a vehicle-body-based unit 20 that is mounted on a vehicle body of the vehicle, and a notification unit 30 connected through a wire to the vehicle-body-based unit 20.

Each tire-based unit 10 measures tire pressure and wirelessly transmits resulting measured values to the vehicle-body-based unit 20 as an air pressure signal. Further, the vehicle-body-based unit 20 receives the air pressure signal which is wirelessly transmitted from each tire-based unit 10 and prepares and outputs notification information, indicative of each tire pressure condition, based on the air pressure signal that is received. Furthermore, the notification unit 30 notifies a vehicle occupant of the tire pressure condition through, for instance, a monitor display, an alarm or the like dependant upon the notification information outputted from the vehicle-body-based unit 20.

With the tire pressure monitoring system set forth above, in general, air pressures within the tires are measured with the respective tire-based units 10 at all times and the air pressure signals, each indicative of a measured value of each tire pressure, are wirelessly transmitted from the respective tire-based units 10 using a transmission frequency (UHF) of, for instance, 315 MHz. Then, the vehicle-body-based unit 20 receives and demodulates the air pressure signals, wirelessly transmitted from the respective tire-based units 10, and prepares and outputs notification information indicative of the air pressure condition within each tire.

When a determination is made that the measured value in tire pressure read by each tire-based unit 10 is an abnormal pressure and the air pressure signal, in which an abnormal code is added to the measured value of the tire pressure, is transmitted, the vehicle-body-based unit 20 provided with such an air pressure signal outputs notification information indicative of the abnormality within any of the tires. Then, the notifying unit 30 responds to the notification information to notify the vehicle occupant as to the status of the tire pressure through, for instance, the monitor display, an alarm or the like. Also, the notifying unit 30 is configured to provide an alert indicative of the occurrence of an abnormality in tire pressure by, for instance, tuning on a warning lamp or activating a buzzer in the occurrence of an abnormality in the tire pressure.

Basic operation of the tire pressure monitoring system set forth above is achieved when sufficient electric power is supplied to both the respective tire-based units 10 and the vehicle-body-based unit 20 to enable the air pressure signals to be wirelessly transmitted and received. It is a general practice for each tire-based unit 10, which is mounted within the tire forming a rotational body, to be supplied with electric power particularly by means of a baby with a limited capacity. Accordingly, considering battery life, it is difficult to supply electric power at all times. Also, it is a general practice for the vehicle-body-based unit 20 to be supplied with electric power from a battery of the vehicle. Consequently, if electric power is supplied from the batteries at all times during parking of the vehicle, it is probable that another issue such as dead battery will result.

With the above view in mind, an attempt has been made in the tire pressure monitoring system so that a low power consumption mode of the battery is set to limit the number of times that the air pressure signals are transmitted and received between the respective tire-based units 10 and the vehicle-body-based unit 20. Thus, power consumption is minimized. Particularly, while the vehicle is parked, it is a general practice to conduct operations in the low power consumption mode.

When the tire pressure monitoring system transmission and reception in the low power consumption mode while the vehicle is parked, timing of the air pressure signal is important. The present invention features that the presence of an occupant getting in the vehicle causes an operation to be executed at least one time for transmitting and receiving the air pressure signal between each tire-based unit 10 and the vehicle-body-based unit 20. Thus, the present invention makes it possible to promptly notify the occupant with the current stats of each tire pressure when the occupant gets in the vehicle.

Hereinafter, a concrete embodiment of a tire pressure monitoring system embodying the present invention is described in detail with reference to the accompanying drawings.

(First Embodiment)

Figure 2:
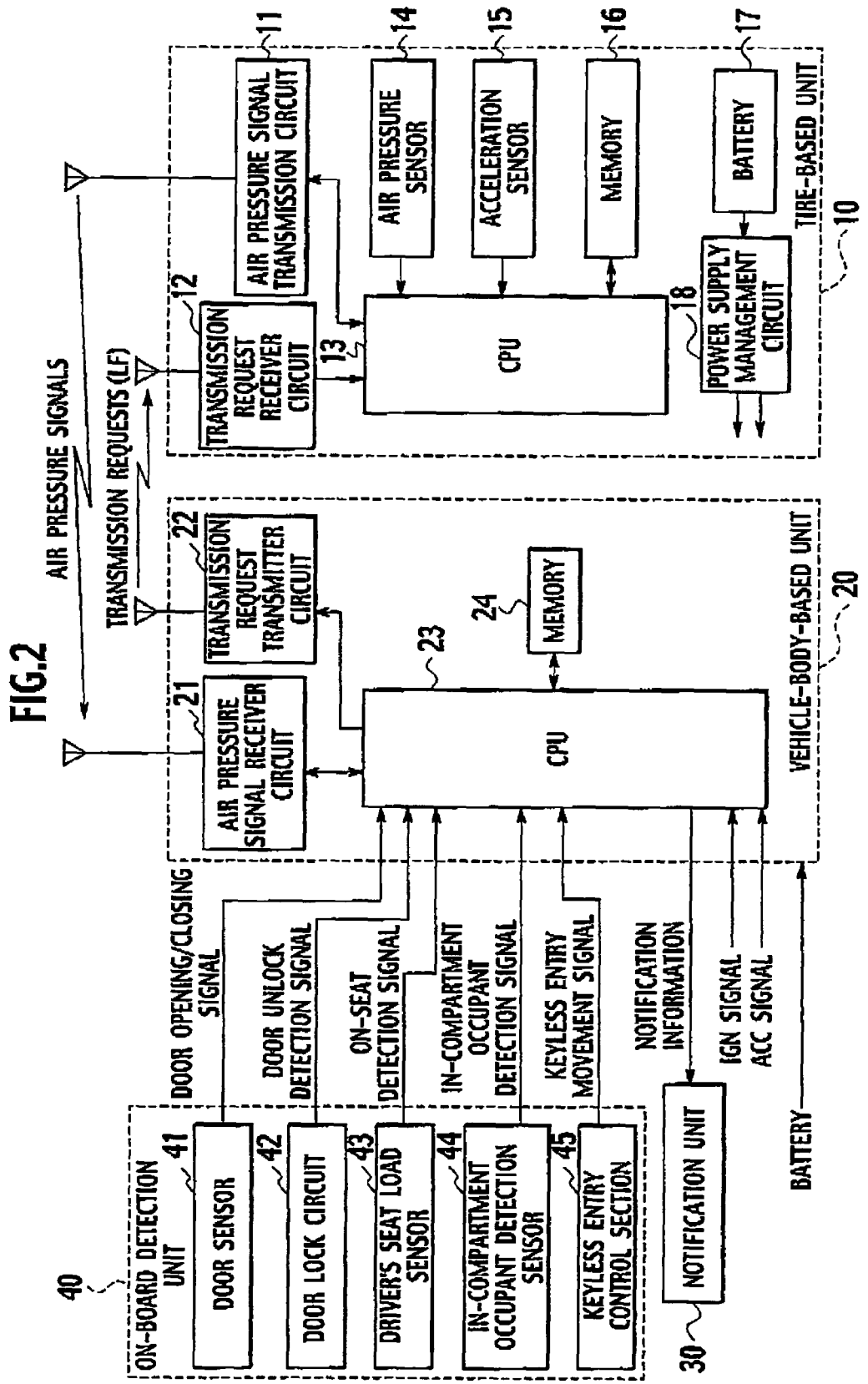
FIG. 2 is a block diagram schematically illustrating a tire pressure monitoring system of the first embodiment of the present invention.

FIG. 2 is a block diagram illustrating a concrete structural example of a tire pressure monitoring system of a first embodiment.

As shown in FIG. 2, the tire pressure monitoring system of the first embodiment includes, in addition to the tire-based units 10, the vehicle-body-based unit 20 and the notifying unit 30, an on-board detection unit 40 that detects the presence of an occupant getting in a vehicle. During operation in the low power consumption mode, when the on-board detection unit 40 detects the presence of the occupant getting in the vehicle and transmits a detection signal indicative of the presence of an occupant getting in a vehicle, the vehicle-body-based unit 20 receives the detection signal and shifts into a condition for achieving transmission and receiving the air pressure signals and transmits transmission requests to the respective tire-based units 10 at a low frequency (LF on the order, for instance, 15 kHz) for requesting the air pressure signals to be transmitted. Upon receipt of these transmission requests, the tire-based units 10 shift into respective conditions available for transmitting the air pressure signals, respectively, and transmit the air pressure signals at least one time to the vehicle-body-based unit 20.

With the air pressure monitoring system of the first embodiment, the tire-based unit 10 is comprised of an air pressure signal transmission circuit 11 by which the air pressure signal is transmitted, a transmission request receiver circuit 12 that receives a low frequency transmission request transmitted from the vehicle-body-based unit 20, and a CPU 13 that serves as a first control portion for controlling operation of the tire-based unit 10. Further, connected to the CPU 13 are an air pressure sensor 14 for measuring air pressure within the tire, an acceleration sensor 15 for detecting movement of the tire, a memory 16 in which the measured value of the air pressure sensor 14 is stored, and other sensors or the like which are not shown.

As a power supply of the tire-based unit 10, a battery 17 is incorporated in the tire-based unit 10. Electric power resulting from this battery 17 is permitted to be supplied to various parts of the tire-based unit 10 via a power supply management circuit 18.

When no detection signal is transmitted from the acceleration sensor 15 to the CPU 13 for a period more than given time interval, that is, when no movement of tire, on which the tire-based unit 10 is mounted, is recognized for a given time interval, determination is made by the CPU 13 that the vehicle is standing still, using the tire-based units 10 to shift to the low power consumption mode.

During the low power consumption mode, the CPU 13 operates such that only the least amount of electric power, enough for the air pressure sensor 14 to monitor the tire pressure, is supplied from the battery 17 while rendering the air pressure signal transmission circuit 11 to remain in a sleep condition. Also, when this operation takes place, for the purpose of checking the system to confirm whether the system remains in a condition available for achieving normal operation mode, the air pressure signal transmission circuit 11 may be intermittently brought into an operative condition, at long intervals, to allow the air pressure signal transmission circuit 11 to transmit the air pressure signal. The long interval is longer than the interval used during normal operation.

The value of the tire pressure, measured by the air pressure sensor 14 during the low power consumption mode, is read to the memory 16 and sequentially updated whereupon resulting data is stored in the memory 16. When the transmission request receiver circuit 12 receives the transmission request from the vehicle-body-based unit 20, the air pressure signal transmission circuit 11 is rendered operative to cancel the low power consumption mode and to allow the resulting air pressure signal retrieved from the memory 16 storing the newest air pressure measured value to transmit at least one time or several times, or for a given time interval under control of the CPU 13. When this takes place, if it is determined that abnormal pressure exists in the measured value of the tire pressure retrieved from the memory 16, the measured value retrieved from the memory 16 is provided with an abnormal code to form the air pressure signal.

The vehicle-body-based unit 20 is comprised of an air pressure signal receiver circuit 21 for receiving the air pressure signals transmitted from the tire-based units 10, a transmission request transmitter circuit 22 for transmitting transmission requests to the tire-based units 10, and a CPU 23 serving as a controller to control operations of the tire-based units 10. Further, connected to the CPU 23 are a memory 24 that temporarily stores the air pressure signals received by the air pressure signal receiver circuit 21, and various sensor or the like which are not shown. Additionally, the CPU 23 is connected to the notifying unit 30 and the on-board detection unit 40 through wires and also connected to an ignition of the vehicle to receive an ignition signal (IGN signal) and an accessory signal (ACC signal) from the ignition.

A power supply of the vehicle-body-based unit 20 includes a battery of the vehicle and, depending upon control of the CPU 23, electric power is supplied from the vehicle battery power supply or the like to various component parts of the vehicle-body-based unit 20.

With the vehicle-body-based unit 20 thus constructed as previously mentioned, when neither IGN signals nor ACC signals from the ignition are delivered to the CPU 23 for more than a given time interval, that is, when no startup occurs in an engine of the vehicle for more than a given time interval, the CPU 23 determines that the vehicle remains in a parked condition, and operation shifts to the low power consumption mode. During the low power consumption mode, like in the tire-based units 10, the CPU 23 controls the systems so that only the least minimal amount of electric power is supplied from the power supply, such as the battery of the vehicle, and the air pressure signal receiver circuit 21 goes into a sleep condition.

When the on-board detection unit 40 detects the presence of the occupant getting in the vehicle, the CPU 23 controls the system so as to cancel the low power consumption mode to render the air pressure signal receiver circuit 21 operative and to permit the transmission request transmitter circuit 22 to transmit the transmission request to the respective tire-based units 10 so as to request the air pressure signals to be transmitted. Then, upon receipt of the transmission request, each tire-based unit 10 transmits the air pressure signal to the air pressure signal receiver circuit 21 whereupon the air pressure signal is demodulated and stored in the memory 24.

Here, the on-board detection unit 40 may include any type of structures provided that the structures can detect the presence of the occupant getting in the vehicle, for instance, a door sensor 41 that outputs a door signal in conjunction with opening/closing of a door of the vehicle, a door lock circuit 42 that outputs a door unlock detection signal in conjunction with the door being unlocked, a driver's seat load sensor 43 that outputs an on-seat detection signal upon detection of load applied to a driver's seat, an in-compartment occupant detection sensor (pyroelectric sensor) 44, that detects the presence of the occupant in a vehicle compartment to output an in-compartment occupant detection signal, and a keyless entry control section 45 that outputs the keyless entry movement signal when a receiver of the keyless entry system receives a door unlock request signal from a transmitter can be effectively employed. Connected to the CPU 23 of the vehicle-body-based unit 20 is at least one of these elements of the on-board detection unit 40, which directly or indirectly detects the presence of the occupant getting in the vehicle to provide the detection signal. This detection signal is applied to the CPU 23 that is configured to enable determination of whether the occupant gets in the vehicle.

Further, the CPU 23 of the vehicle-body-based unit 20 sequentially retrieves the air pressure signals, which are received by the air pressure signal receiver circuit 21 during the entry of the occupant and temporarily stored in the memory 24, and prepares notification information indicative of the status of the air pressures within the respective tires. Then, the notification information is outputted to the notifying unit 30. This operation allows the monitor display of the notifying unit 30 to provide the vehicle occupant with notification of the status of the tire pressures. Also, when an abnormality occurs in the tire pressure, warning of resulting notification is provided, for instance, by turning on the warning lamp or by sounding the buzzer.

The output of notification information resulting from the CPU 23 and the operation of the monitor display or the like caused by the notifying unit 30 may be established immediately when the getting-in of the occupant is detected. It is preferable for the output of notification information resulting from the CPU 23 and the operation of the monitor display or the like caused by the notifying unit 30 to be established when the CPU 23 receives with the IGN signal or the ACC signal delivered from the ignition. According to the first embodiment of the present invention, the issue of wasteful consumption of electric power is resolved.

Figure 3:
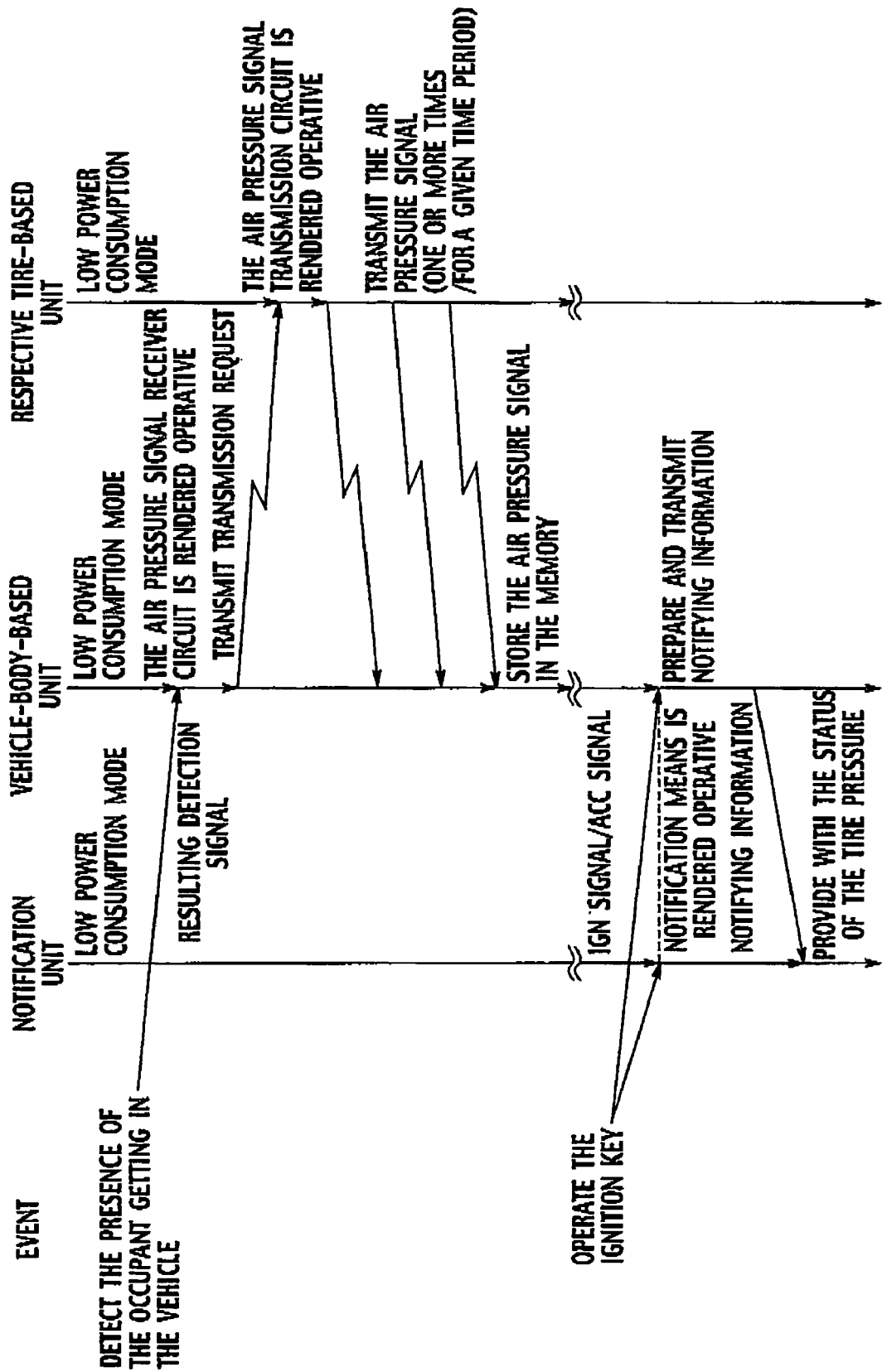
FIG. 3 is a sequence diagram schematically showing the operation of the first embodiment of the present invention.

Now, an outline of the operation in the tire pressure monitoring system of the first embodiment is described with reference to FIG. 3. FIG. 3 is a sequence representation illustrating the flow of operations of the tire-based unit 10, the vehicle-body-based unit 20 and the notifying unit 30 during a phase wherein, at a halt of the vehicle, the occupant gets in the vehicle and starts vehicle movement.

When the vehicle is parked, any of the tire-based units 10, the vehicle-body-based unit 20 and the notifying unit 30 remain in the low power consumption mode and merely a minimal amount of electric power is supplied to the associated component parts. Accordingly, both the air pressure signal transmission circuit 11 of the tire-based unit 10 and the air pressure signal receiver circuit 21 of the vehicle-body-based unit 20 remain in the sleep condition, during which time no transmission and reception of the air pressure signals are performed.

Subsequently, if the on-board detection unit 40 detects the presence of the occupant getting in the vehicle and a resulting detection signal is applied to the CPU 23 of the vehicle-body-based unit 20, the low power consumption mode of the vehicle-body-based unit 20 is cancelled and the air pressure signal receiver circuit 21 is rendered operative, permitting the transmission request transmitter circuit 22 to transmit a transmission request to each tire-based unit 10 for requesting the air pressure signal to be transmitted.

When the transmission request receiver circuit 12 of each tire-based unit 10 receives the transmission request from the vehicle-body-based unit 20, the low power consumption mode of each tire-based unit 10 is cancelled to render the air pressure signal transmission circuit 11 operative to permit the air pressure signal transmission circuit 11 to transmit the newest (most-recent) tire pressure measured value to the on-vehicle-body-based unit 20 one or more times, or for a given time period as the air pressure signal.

The air pressure signal, transmitted from each tire-based unit 10 to the vehicle-body-based unit 20, is temporarily stored in the memory 24 of the vehicle-body-based unit 20. Thereafter, at a stage when the IGN signal from the ignition of the vehicle and/or the ACC signal are applied to the CPU 23 of the vehicle-body-based unit 20, the CPU 23 retrieves the air pressure signal stored in the memory 24 and prepares notification information indicative of the status of the tire pressure. Also, when this takes place, due to the IGN signal from the ignition of the vehicle and/or the ACC signal being supplied, the low power consumption mode of the notifying unit 30 is cancelled and the notifying unit 30 is rendered normally operative, whereupon notification information prepared by the vehicle-body-based unit 20 is outputted to the notifying unit 30. Then, the notifying unit 30 provides a display of this notification information over the monitor display or the like, thereby providing the vehicle occupant with the status of the tire pressure. Moreover, if an abnormality occurs in the tire pressure, turning on the warning lamp or sounding the buzzer permits the warning to be provided representing the occurrence of the abnormality in the tire pressure.

As set forth above, with the tire pressure monitoring system of the first embodiment, the air pressure signal receiver circuit 21 of the vehicle-body-based unit 20 is rendered operative when the on-board detection unit 40 detects the presence of the occupant getting in the vehicle. Then, the transmission request is transmitted from the transmission request transmitter circuit 22 to each tire-based unit 10. After the transmission request receiver circuit 12 receives the transmission request, the air pressure signal transmission circuit 11 of the tire-based unit 10 is rendered operative to transmit the air pressure signal at least one time to the vehicle-body-based unit 20. Consequently, the occupant can be promptly provided with notification of the status of the tire pressure when the occupant gets in the vehicle. When an abnormality occurs in the tire pressure, the occupant can be urged to take some counter measure prior to starting up the engine to actually run the vehicle.

Further, with the tire pressure monitoring system of the first embodiment, each tire-based unit 10 is configured to transmit the air pressure signal in response to the transmission request from the vehicle-body-based unit 20. Accordingly, adjusting a timing, at which the transmission request is transmitted from the vehicle-body-based unit 20 to each tire-based unit 10, enables timing control such that a timing at which the air pressure signal is transmitted from one tire-based unit 10 does not overlap with a timing at which the other tire-based unit 10 transmits the air pressure signal, thereby enabling the air pressure signal transmitted from each tire-based unit 10 to be reliably received by the vehicle-body-based unit 20.

Further, in the absence of the air pressure signal from the tire-based unit 10 responsive to the transmission request from the vehicle-body-based unit 20, it can be estimated that the relevant tire-based unit 10 has encountered some kind of problem, such as transmission defect, as a result of a drop in battery voltage, and such notification is remarkably effective in checking the system.

(Second Embodiment)

Figure 4:
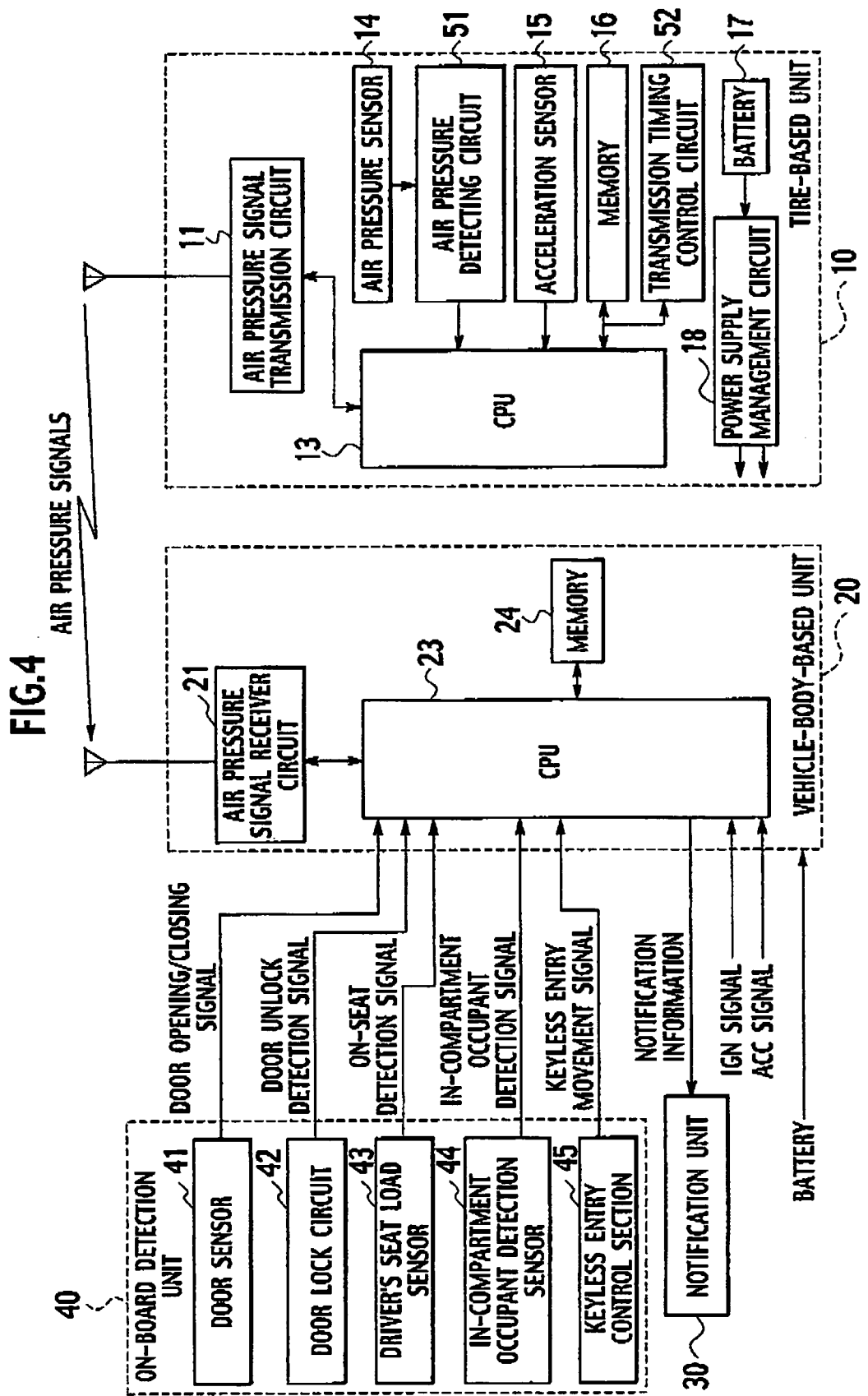
FIG. 4 is a block diagram schematically showing a tire pressure monitoring system of the second embodiment of the present invention.

Next, description is made of a tire pressure monitoring system of a second embodiment to which the present invention is applied. FIG. 4 is a block diagram illustrating a concrete structural example of the tire pressure monitoring system of the present embodiment. Also, the same component parts as those of the first embodiment described above bear like reference numerals in FIG. 4.

Although the tire pressure monitoring system of the present embodiment is similar in structure to that of the first embodiment set forth above in that the low power consumption mode of the on-vehicle-body-based unit 20 is responsive to the detection signal from the on-board detection unit 40, the present embodiment differs from the first embodiment in the technology of canceling the low power consumption mode of each tire-based unit 10. That is, while the first embodiment is arranged such that when each tire-based unit 10 receives the transmission request from the on-vehicle-unit 20, the low power consumption mode of each tire-based unit 10 is cancelled, the tire pressure monitoring system of the present embodiment is configured to allow each tire-based unit 10 to detect rapid fluctuation in the tire pressure of each tire-based unit 10 to thereby independently determine, whether the occupant has entered in the vehicle, to allow the low power consumption mode to be cancelled. The arrangement is such that when low power consumption modes are cancelled in both of the vehicle-body-based unit 20 and each tire-based unit 10, the air pressure signal is transmitted or received at least one time between the respective tire-based units 10 and the vehicle-body-based unit 20.

With the tire pressure monitoring system of the present embodiment, the tire-based unit 10 is comprised of the air pressure signal transmission circuit 11 for transmitting the air pressure signal, an air pressure change detecting circuit 51 that detects fluctuation in the tire pressure, a transmission timing control circuit 52 that controls a timing at which the air pressure signal transmission circuit 11 transmits the air pressure signal, and the CPU 13 serving as the first control portion that controls operation of the relevant tire-based unit 10. Further, the air pressure sensor 14 for measuring the tire pressure is connected through the air pressure change detection circuit 51 to the CPU 13, to which the acceleration sensor 15 for detecting the movement of the vehicle and tire, the memory 16 for storing the measured value of the air pressure sensor and other sensors or the like, which are not shown, are connected.

As a power supply of this tire-based unit 10, the battery 17 incorporated in the relevant tire-based unit 10 is employed, and the CPU 23 controls the battery 17 to supply electric power to various parts of the tire-based unit 10 through the battery management circuit 18.

With the tire-based unit 10 with such a structure mentioned above, if a detection signal is not transmitted from the acceleration sensor 15 for more than a given time interval, that is, when no movement is determined in the relevant tire-based unit 10 for more than the given time interval, a determination is made by the CPU 23 that the vehicle is parked, and the tire-based unit 10 is shifted to the low power consumption mode.

During the low power consumption mode, the CPU 23 controls the electric power to be supplied from the battery 17 to a minimal rate necessary for monitoring the tire pressure while the air pressure signal transmission circuit 11 is brought into the sleep condition. Also, when this takes place, for the purpose of checking the system to confirm whether the system remains in the condition for normal operation, the air pressure signal transmission circuit 11 may be intermittently rendered operative so as to allow the air pressure signal transmission circuit 11 to transmit the air pressure signal between longer periods than that at which the air pressure signal is transmitted during normal operation.

The measured value of the tire pressure, measured by the air pressure sensor 14 during operation at the low power consumption mode, is read to the memory 16 and stored therein upon updating being sequentially executed. When the air pressure change detection circuit 51 detects rapid increase in air pressure exceeding an error range, the CPU 13 cancels the low power consumption mode for rendering the air pressure signal transmission circuit 11 operative to allow the newest air pressure measured value, stored in the memory 16, to be retrieved so that the measured value is transmitted from the air pressure signal transmission circuit 11 one or more times or for the given time interval.

That is, when the occupant enters in the vehicle, the tire pressure exceeds the error range and remarkably increases in the parked state of the vehicle. Therefore, the present embodiment is configured such that when the movement of the tire can not be detected by the acceleration sensor 15 (movement detecting means) for more than the given time interval and when rapid increase of the tire pressure is detected by the air pressure change detection circuit 51, the CPU 13 determines the presence of the occupant entering in the vehicle, whereupon the low power consumption mode is cancelled to allow the air pressure signal transmission circuit 11 to transmit the air pressure signal. Further, if this instant determination is made that an abnormal pressure occurs in the measured value of the tire pressure read from the memory 16, the air pressure signal, in which an abnormal code is added to the measured value read out from the memory 16, is transmitted.

Further, it is conceivable that if the air pressure signals are simultaneously transmitted from the respective tire-based units 10 mounted in the four tires, including left and right and fore and aft wheels, of the vehicle to one air pressure signal receiver circuit 21 of the vehicle-body-based unit 20, the air pressure signals from the respective tire-based units 10 mutually interfere and the air pressure signals delivered from the respective tire-based units 10 can not be received with the vehicle-body-based unit 20. Therefore, with the present embodiment, the transmission timing control circuit 52 of each tire-based unit 10 operates such that the timing, at which the air pressure signal is transmitted from the air pressure signal transmission circuit 11, does not overlap the transmission timing of the other tire-based unit 10, thereby enabling the air pressure signals transmitted from the tire-based units 10, respectively, to be reliably received with one air pressure signal receiver circuit 21 of the vehicle-body-based unit 20.

The vehicle-body-based unit 20 includes the air pressure signal receiver circuit 21 for receiving the air pressure signals from the tire-based units 10, and the CPU 23 serving as a second control portion that controls operation of the vehicle-body-based unit 20. Further, the memory 24 that temporarily stores the air pressure signals received with the air pressure signal receiver circuit 21, and a variety of sensors or the like which are not shown are connected to the CPU 23. Additionally, the CPU 23 is connected to the notifying unit 30 and the on-board detection unit 40 through wires and also connected to the ignition of the vehicle to allow the IGN signal from the ignition and/or the ACC signal to be applied.

As the power supply of the vehicle-body-based unit 20, use is made of the battery of the vehicle like in the first embodiment, and the CPU 23 controls the power supply to supply electric power to various parts of the vehicle-body-based unit 20.

With the vehicle-body-based unit 20 of the structure mentioned above, if none of the IGN signal from the ignition and/or the ACC signal is delivered to the CPU 23 for more than a given time interval, that is, when the engine of the vehicle is not started up for more than a given time interval the CPU 23 determines that the vehicle remains in a parked condition, and the vehicle-body-based unit 20 is shifted to the low power consumption mode. During the low power consumption mode, the CPU 23 permits a minimal amount of electric power to be supplied from the power supply, such as the battery etc., of the vehicle, while permitting the air pressure signal receiver circuit 21 to go into the sleep condition.

When the on-board detection unit 40 detects the presence of the occupant getting in the vehicle, the CPU 23 cancels the low power consumption mode to render the air pressure signal receiver circuit 21 operative. Then, the air pressure signals transmitted from the respective tire-based units 10 are received with the air pressure signal receiver circuit 21 and demodulated by the CPU 23 to be read into the memory 24.

Here, the on-board detection unit 40 may include any type of structures, like in the first embodiment mentioned above, provided that the structures can detect the presence of the occupant getting in the vehicle and, for instance, the door sensor 41 that outputs the door signal in conjunction with opening or closing of the door of the vehicle, the door lock circuit 42 that outputs the door unlock detection signal in conjunction with the door being unlocked, the driver's seat load sensor 43 that outputs the on-seat detection signal upon detection of load applied to the driver's seat, the in-compartment occupant detection sensor (pyroelectric sensor) 44, that detects the presence of the occupant in the vehicle compartment to output the in-compartment occupant detection signal, and the keyless entry control section 45 that outputs the keyless entry movement signal when the receiver of the keyless entry system receives the door unlock request signal from the transmitter can be effectively employed. Connected to the CPU 23 of the vehicle-body-based unit 20 is at least one of the foregoing elements of the on-board detection unit 40.

Further, the CPU 23 of the vehicle-body-based unit 20 sequentially retrieves the air pressure signals, which are received by the air pressure signal receiver circuit 21 during entry by the occupant and stored in the memory 24, and prepares notification information indicative of the status of the air pressures within the respective tires. Then, the notification information is outputted to the notifying unit 30. Consequently, the status of the tire pressures is displayed on the monitor display of the notifying unit 30 to notify the vehicle occupant. When an abnormality occurs in the tire pressure, warning of resulting notification is provided, for instance, by turning on the warning lamp or by sounding the buzzer.

Also, the output of notification information resulting from the CPU 23 and the operation of monitor display or the like caused by the notifying unit 30 may be established at a stage when the IGN signal from the ignition and the ACC signal are supplied to the CPU 23, like in the first embodiment set forth above. This makes it possible for the occupant to be reliably provided with the stats of the tire pressures, when the occupant gets in the vehicle compartment to begin driving of the vehicle, while effectively addressing the issue of wasteful consumption of electric power resulting from continuous operation of the notifying unit 30.

Figure 5:
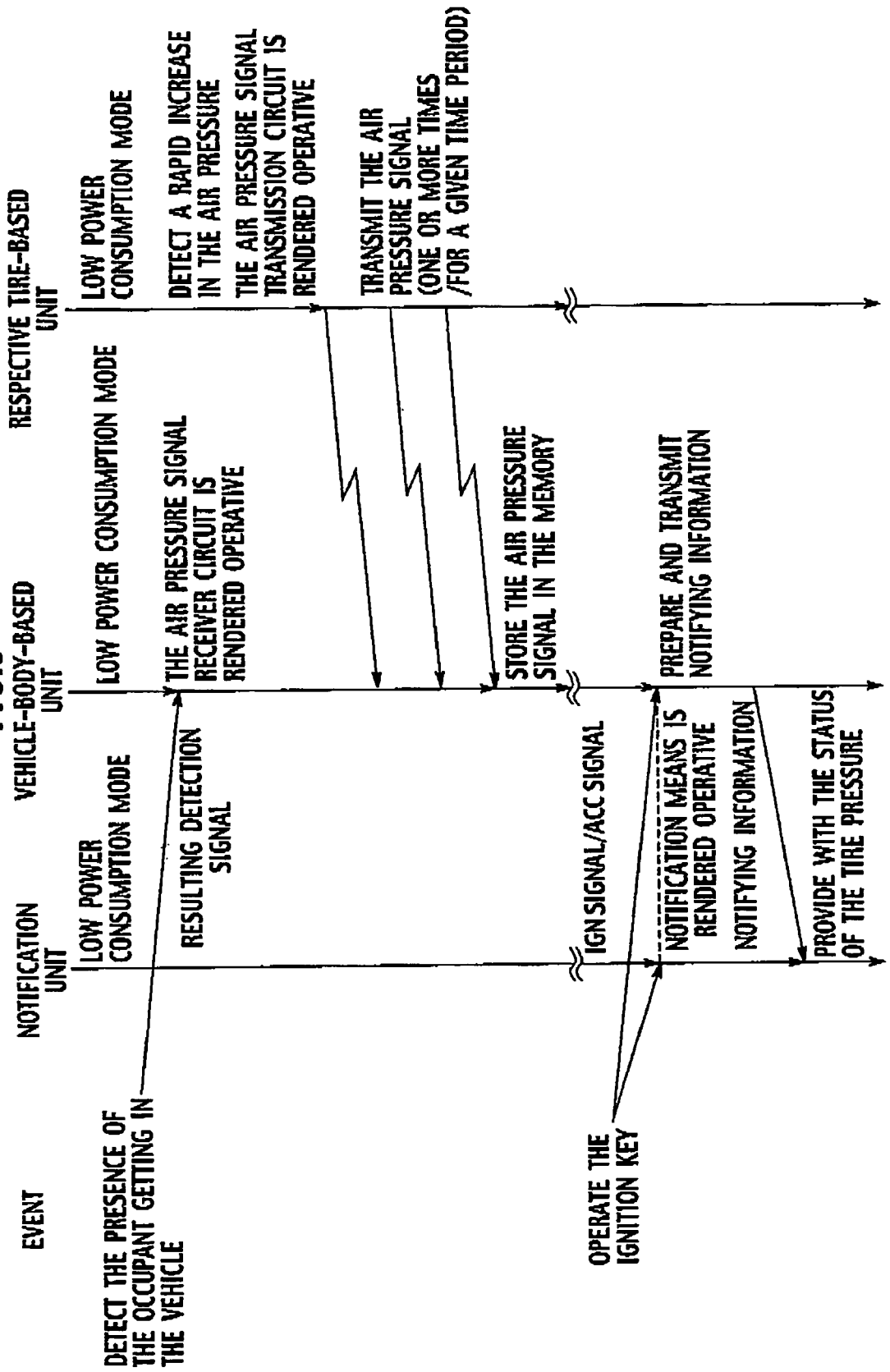
FIG. 5 is a sequence diagram schematically showing the operation of the second embodiment of the present invention.

Now, an outline of operation in the tire pressure monitoring system of the present embodiment is described with reference to FIG. 5. FIG. 5 is a sequence representation illustrating the flow of operations of the tire-based unit 10, the vehicle-body-based unit 20 and the notifying unit 30 during a phase wherein, the occupant gets in the vehicle to drive the vehicle.

When the vehicle has been parked, the tire-based unit 10, the vehicle-body-based unit 20 and the notifying unit 30 remain in the low power consumption mode and a minimal amount of electric power is supplied. Accordingly, both the air pressure signal transmission circuit 11 of the tire-based unit 10 and the air pressure signal receiver circuit 21 of the vehicle-body-based unit 20 remain in the sleep condition, during which time no transmission and receiving of the air pressure signals are performed.

Subsequently, if the on-board detection unit 40 detects the presence of the occupant getting in the vehicle and a resulting detection signal is applied to the CPU 23 of the vehicle-body-based unit 20, the low power consumption mode of the vehicle-body-based unit 20 is canceled, and the air pressure signal receiver circuit 21 is rendered operative.

Further, when the air pressure in each tire rapidly increases due to the presence of the occupant getting in the vehicle and the air pressure change detection circuit 51 of each tire-based unit 10 detects an increase in the air pressure of the tire, the low power consumption mode of each tire-based unit 10 is cancelled to render the air pressure signal transmission circuit 11 operative to permit the air pressure signal transmission circuit 11 to transmit the newest tire pressure measured value one or more times or for a given time period to the on-vehicle-body-based unit 20. When this takes place, the transmission timing control circuit 52 controls a timing at which the air pressure signal is transmitted from the air pressure signal receiver circuit 21 of each tire-based unit 10 so that the signals do not overlap with the transmission timing of the other tire-based unit 10.

The air pressure signal transmitted from each tire-based unit 10 to the vehicle-body-based unit 20, is temporarily stored in the memory 24 of the vehicle-body-based unit 20. Thereafter, at a stage when the IGN signal from the ignition of the vehicle and/or the ACC signal are applied to the CPU 23 of the vehicle-body-based unit 20, the CPU 23 retrieves the air pressure signal stored in the memory 24 and prepares notification information indicative of the status of the tire pressure. Also, when this takes place, due to the IGN signal from the ignition of the vehicle and/or the ACC signal being supplied, the low power consumption mode of the notifying unit 30 is cancelled and rendered normally operative. Notification information is then prepared by the vehicle-body-based unit 20 is outputted to the notifying unit 30. Then, the notifying unit 30 provides a display of this notification information over the monitor display or the like, thereby providing the vehicle occupant with the status of the tire pressure. Moreover, if an abnormality occurs in the tire pressure, turning on the warning lamp or sounding the buzzer permits the warning to be provided representing the occurrence of abnormality in the tire pressure.

As set forth above, with the tire pressure monitoring system of the present embodiment, the air pressure signal receiver circuit 21 of the vehicle-body-based unit 20 is rendered operative when the on-board detection unit 40 detects the presence of the occupant getting in the vehicle. Further, when the air pressure change detection circuit 51 of each tire-based unit 10 detects rapid change in the tire pressure that makes it possible to estimate the presence of the occupant getting in the vehicle, the air pressure signal transmission circuit 11 of the tire-based unit 10 is rendered operative. Then, since transmission and reception of the air pressure signal are enabled at least one time between the tire-based unit 10 and the vehicle-body-based unit 20, the occupant can be promptly provided with notification of the status of the tire pressure when the occupant gets in the vehicle and, when an abnormality occurs in the tire pressure, the occupant can be urged to take some counter measure prior to starting up the engine to drive the vehicle.

Further, with the tire pressure monitoring system of the present embodiment, since each tire-based unit 10 includes the transmission timing control circuit 52 for controlling the timing at which the air pressure signal transmission circuit 11 of one tire-based unit 10 transmits the air pressure signal so that the signals does not overlap the timing at which the other tire-based unit 10 transmits the air pressure signal, the vehicle-body-based unit 20 is able to reliably receive the air pressure signal from each tire-based unit 10.

Figure 6:
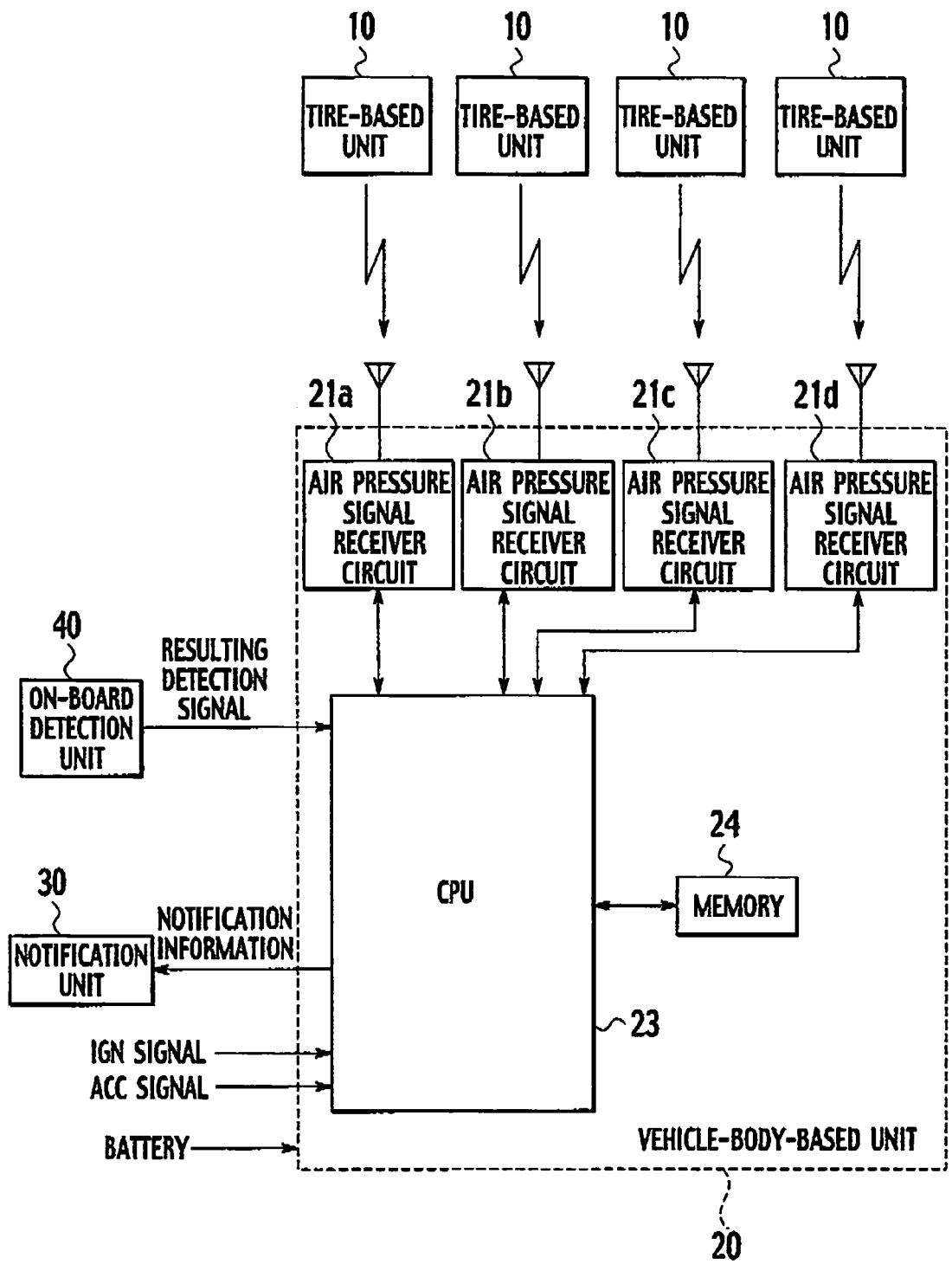
FIG. 6 is a block diagram schematically showing other embodiments relating the second embodiment of the present invention.

Also, the foregoing has been described with reference to an example which is premised on the vehicle-body-based unit 20 including one air pressure signal receiver circuit 21 and the air pressure signal receiver circuit 21 receives the air pressure signals from the respective tire-based units 10. However, as shown in FIG. 6, the vehicle-body-based unit 20 may be structured so as to include four air pressure signal receiver circuits 21a, 21b, 21c, 21d in correspondence with four tire-based units 10, respectively, to allow these four air pressure signal receiver circuits 21a, 21b, 21c, 21d to individually receive the air pressure signals transmitted from the respective tire-based units 10. With such a structure being adopted, even if the air pressure signals are simultaneously transmitted from the respective tire-based units 10, the vehicle-body-based unit 20 is enabled to reliably receive the air pressure signals, transmitted from the respective tire-based units 10, without causing these signals to mutually interfere, resulting in no need for the transmission timing control circuit 52 of each tire-based unit 10 to be provided.

(Third Embodiment)

Figure 7:
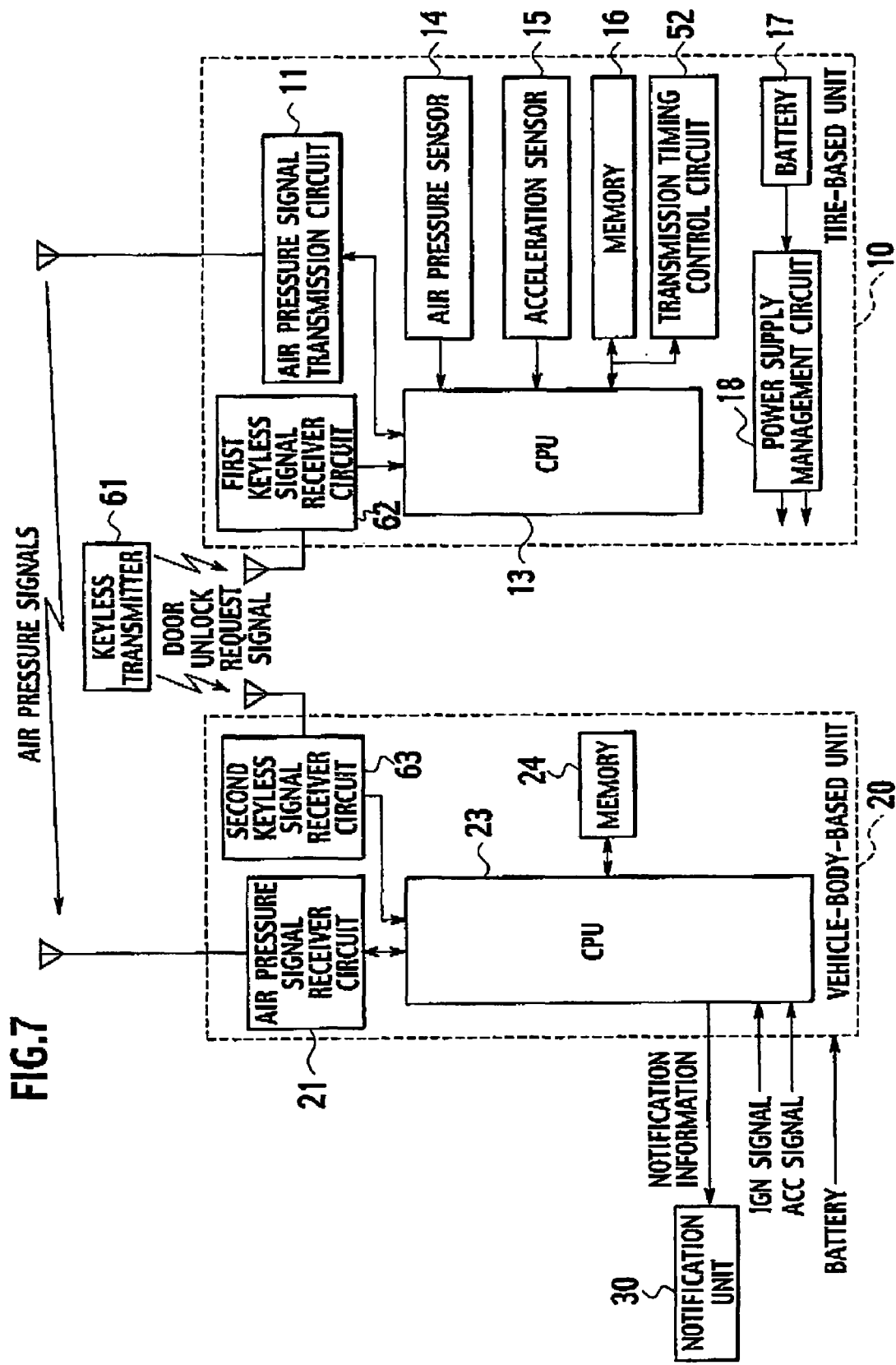
FIG. 7 is a block diagram schematically showing the third embodiment of the present invention.

Next, description is made of a tire pressure monitoring system of a third embodiment to which the present invention. FIG. 7 is a block diagram illustrating a concrete structure of the tire pressure monitoring system of the present embodiment. Also, the same component parts as those of the first and the second embodiments bear like reference numerals in FIG. 7.

The tire pressure monitoring system of the present embodiment employs a keyless entry system as an on-board detection means, and the respective tire-based units 10 and the vehicle-body-based unit 20 have functions to receive a door unlock request signal transmitted from a keyless transmitter 61. When the respective tire-based units 10 and the vehicle-body-based unit 20 receive the door unlock request signal from the keyless transmitter 61, respectively, the low power consumption modes of the respective tire-based units 10 and the vehicle-body-based unit 20 are cancelled, and the air pressure signal is transmitted and received at least one time between these tire-based units 10 and the vehicle-body-based unit 20. Also, the keyless entry system is configured to allow the keyless transmitter 61, carried by the vehicle occupant, to transmit the door unlock request signal whereupon when the keyless receiver, mounted on the vehicle, receives this door unlock request signal, an actuator is operated to automatically unlock the door of the vehicle.

With the tire pressure monitoring system of the present embodiment, the tire-based unit 10 is comprised of the air pressure signal transmission circuit 11 for transmitting the air pressure signal, a first keyless signal receiver circuit 62 for receiving a door unlock request signal from the keyless transmitter 61, the transmission timing control circuit 52 that controls the timing at which the air pressure signal transmission circuit 11 transmits the air pressure signal, and the CPU 13 serving as the first control portion that controls operation of the relevant tire-based unit 10. Further, connected to the CPU 13 are the air pressure sensor 14 for measuring the tire pressure, the acceleration sensor 15 for detecting the movement of the tire, the memory 16 for storing the measured value of the air pressure sensor, and other sensors or the like, which are not shown.

As the power supply of this tire-based unit 10, the battery 17 incorporated in the relevant tire-based unit 10 is employed, and the CPU 23 controls the battery 17 to supply electric power to various parts of the tire-based unit 10 through the battery management circuit 18.

With the tire-based unit 10 with such a structure mentioned above, if a detection signal is not transmitted from the acceleration sensor 15 for more than a given time interval, that is, when no movement is found by the relevant tire-based unit 10 for more than the given time interval, determination is made by the CPU 23 that the vehicle is parked, and the tire-based unit 10 is shifted to the low power consumption mode.

During the low power consumption mode, the CPU 23 controls the operation to supply a minimal amount of electric power from the battery 17 at a rate necessary for monitoring the tire pressure and the air pressure signal transmission circuit 11 is brought into the sleep condition. Also, when this takes place, for the purpose of checking the system to confirm whether the system remains in the condition for normal operation, the air pressure signal transmission circuit 11 may be intermittently rendered operative so as to allow the air pressure signal transmission circuit 11 to transmit the air pressure signal between longer periods than that at which the air pressure signal is transmitted during normal operation.

The measured value of the tire pressure, measured by the air pressure sensor 14 during operation at the low power consumption mode, is read in the memory 16 and stored therein while updating is sequentially executed. When the first keyless signal receiver circuit 62 receives the door unlock request signal from the keyless transmitter 61, the CPU 13 cancels the low power consumption mode to render the air pressure signal transmission circuit 11 operative to allow the newest air pressure measured value, stored in the memory 16, to be retrieved whereby the measured value is transmitted from the air pressure signal transmission circuit 11 as the air pressure signal one or more times or for the given time interval.

That is, since a situation wherein the door unlock request signal is transmitted from the keyless transmitter 61 takes place, the present embodiment is configured such that when the first keyless signal receiver circuit 62 receives the door unlock request signal from the keyless transmitter 61, the CPU 13 determines the occupant will enter the vehicle and cancels the low power consumption mode to allow the air pressure signal transmission circuit 11 to transmit the air pressure signal. Further, if in this instant, determination is made that an abnormal pressure occurs in the measured value of the tire pressure read from the memory 16, the air pressure signal, including an abnormal code is transmitted.

Further, like in the second embodiment set forth above, the transmission timing control circuit 52 precludes the timing, at which the air pressure signal is transmitted from one tire-based unit 10, from overlapping the transmission timing of the other tire-based unit 10, thereby enabling the air pressure signals transmitted from the tire-based units 10, respectively, to be reliably received with one air pressure signal receiver circuit 21 of the vehicle-body-based unit 20. Also, as already described above with reference to the second embodiment, in place of providing the tire-based units 10 including the transmission timing control circuits 52, respectively, an alternative may take a structure in that the vehicle-body-based unit 20 includes a plurality of air pressure signal receiver circuits 21a, 21b, 21c, 21d in correspondence with the respective tire-based units 10 to allow the air pressure signal receiver circuits 21a, 21b, 21c, 21d to individually receive the air pressure signals transmitted from the tire-based units 10, respectively.

The vehicle-body-based unit 20 includes the air pressure signal receiver circuit 21 for receiving the air pressure signals from the tire-based units 10, a second keyless signal receiver circuit 63 for receiving a door unlock request signal from the keyless transmitter 61, and the CPU 23 serving as the second control portion that controls operation of the vehicle-body-based unit 20. Further, connected to the CPU 23 are the memory 24 that temporarily stores the air pressure signals received with the air pressure signal receiver circuit 21, and a variety of sensors or the like which are not shown. Additionally, the CPU 23 is connected to the notifying unit 30 through the wire and also connected to the ignition of the vehicle to allow the IGN signal from the ignition and the ACC signal to be applied.

As the power supply of the vehicle-body-based unit 20, the battery of the vehicle is employed like in the first and second embodiments set forth above, and the CPU 23 controls the power supply to supply electric power to various parts of the vehicle-body-based unit 20.

With the vehicle-body-based unit 20 of the structure mentioned above, if none of the IGN signal from the ignition and/or the ACC signal is delivered to the CPU 23 for more than a given time interval, that is, when the engine of the vehicle is not started up for more than a given time interval, then, the CPU 23 determines that the vehicle remains in the parked condition, and the vehicle-body-based unit 20 is shifted to the low power consumption mode. During the low power consumption mode, the CPU 23 controls the power supply to provide the minimal amount of electric power from the power supply and the air pressure signal receiver circuit 21 is brought into the sleep condition.

When the second keyless signal receiver circuit 63 receives the door unlock request signal from the keyless transmitter 61, determination is made that a situation arises where the occupant is getting in the vehicle, and th CPU 23 controls the low power consumption mode to be cancelled and the air pressure signal receiver circuit 21 is rendered operative. Then, the air pressure signals transmitted from the respective tire-based units 10 are received by the air pressure signal receiver circuit 21 and demodulated by the CPU 23 to be read into the memory 24.

Further, the CPU 23 of the vehicle-body-based unit 20 sequentially retrieves the air pressure signals, which are received by the air pressure signal receiver circuit 21 during entry by the occupant and temporarily stored in the memory 24, and prepares notification information indicative of the statuses of the air pressures within the respective tires. Then, this notification information is outputted to the notifying unit 30. This allows the monitor display of the notifying unit 30 to provide the vehicle occupant with notification of the status of the tire pressure. When an abnormality occurs in the tire pressure, warning of resulting notification is provided, for instance, by turning on the warning lamp or by sounding the buzzer.

Also, the output of notification information resulting from the CPU 23 and the operation of monitor display or the like caused by the notifying unit 30 may be established at a stage when the IGN signal from the ignition and/or the ACC signal are applied to the CPU 23, like in the first and second embodiments set forth above. This makes it possible for the occupant to be reliably provided with the status of the tire pressure, when the occupant gets in the vehicle compartment to begin driving of the vehicle, while effectively addressing the issue of wasteful consumption of electric power resulting from continuous operation of the notifying unit 30 regardless of the situation where the occupant moves away from the vehicle.

Figure 8:
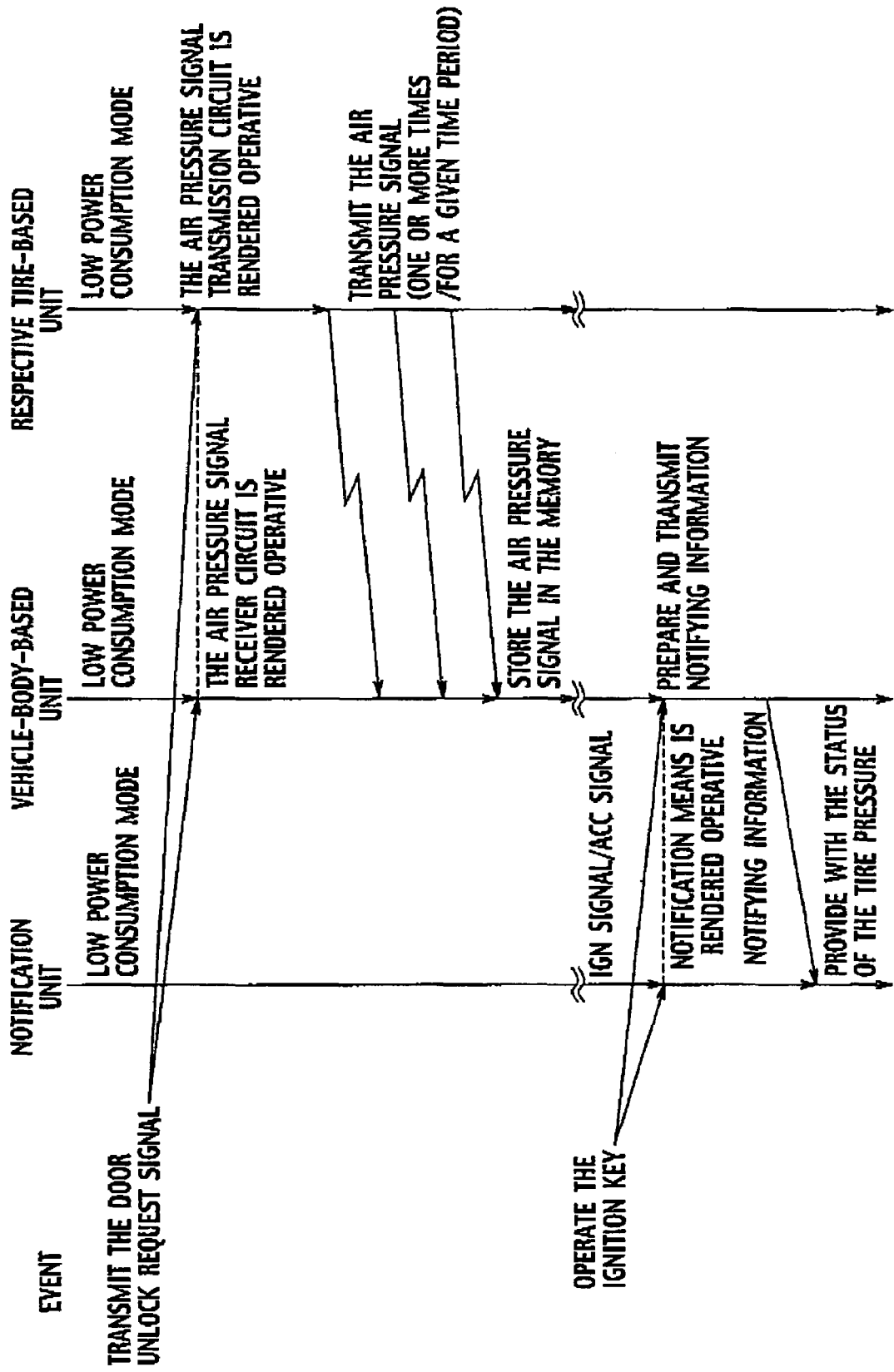
FIG. 8 is a sequence diagram schematically showing the operation of the third embodiment of the present invention.
Figure 9:
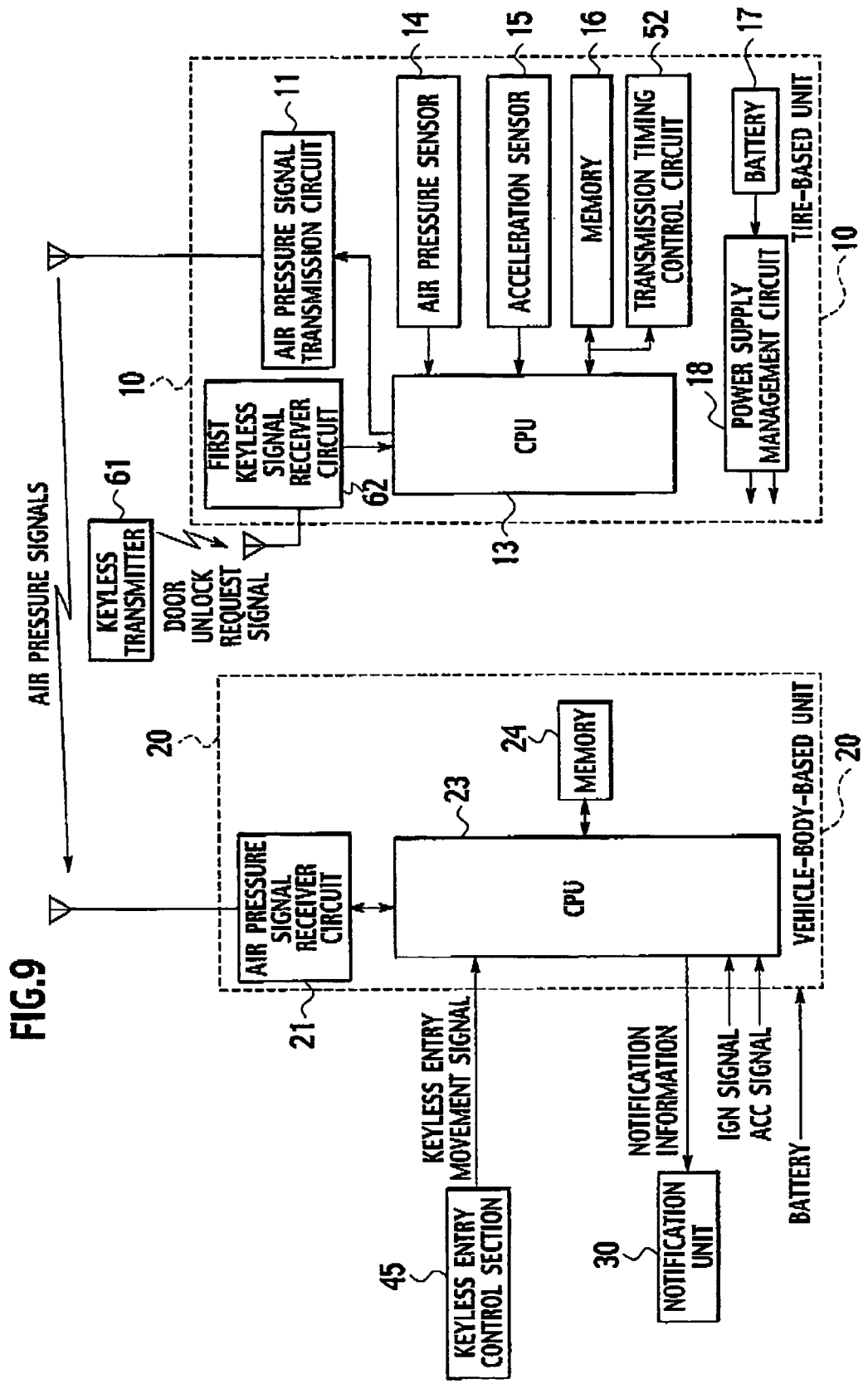
FIG. 9 is a block diagram schematically showing other embodiments relating the third embodiment of the present invention.

Now, an outline of operation of the tire pressure monitoring system of the present embodiment is described with reference to FIG. 8. FIG. 8 is a sequence representation illustrating the flows of operations of the tire-based unit 10, the vehicle-body-based unit 20 and the notifying unit 30 during a phase wherein, when the vehicle is parked, the occupant gets in the vehicle and drives the vehicle.

When the vehicle is parked, any one of the tire-based unit 10, the vehicle-body-based unit 20 and the notifying unit 30 remains in the low power consumption mode and a minimal amount of electric power is supplied. Accordingly, both the air pressure signal transmission circuit 11 of the tire-based unit 10 and the air pressure signal receiver circuit 21 of the vehicle-body-based unit 20 remains in the sleep condition during which time no transmission and receiving of the air pressure signals are performed Subsequently, if the keyless transmitter 61 transmits the door unlock request signal which in turn is received with the second keyless signal receiver circuit 63 of the vehicle-body-based unit 20, the low power consumption mode of the vehicle-body-based unit 20 is cancelled, and the air pressure signal receiver circuit 21 is rendered operative. Further, simultaneously, if the first keyless signal receiver circuit 62 of each tire-based unit 10 receives the door unlock request signal from the keyless transmitter 61, the low power consumption mode of each tire-based unit 10 is cancelled, and the air pressure signal transmission circuit 11 is rendered operative. Then, the air pressure signal transmission circuit 11 transmits the newest tire pressure measured value one or more times or for the given time interval to the vehicle-body-based unit 20 as the air pressure signal.

The air pressure signal transmitted from each tire-based unit 10 to the vehicle-body-based unit 20, is temporarily stored in the memory 24 of the vehicle-body-based unit 20. Thereafter, at a stage when the IGN signal from the ignition of the vehicle and the ACC signal are applied to the CPU 23 of the vehicle-body-based unit 20, the CPU 23 retrieves the air pressure signal stored in the memory 24 and prepares notification information indicative of the status of the tire pressure. Also, when this takes place, due to the IGN signal from the ignition of the vehicle and the ACC signal being supplied, the low power consumption mode of the notifying unit 30 is cancelled to be rendered normally operative, and notification information prepared by the vehicle-body-based unit 20 is outputted to the notifying unit 30. Then, the notifying unit 30 provides a display of this notification information over the monitor display or the like, thereby providing the vehicle occupant with the status of the tire pressure. Moreover, if an abnormality occurs in the tire pressure, turning on the warning lamp or sounding the buzzer permits the warning to be provided representing the occurrence of abnormality in the tire pressure.

As set forth above, with the tire pressure monitoring system of the present embodiment, since the air pressure signal transmission circuit 11 of each tire-based unit 10 and the air pressure signal receiver circuit 21 of the vehicle-body-based unit 20 are rendered operative, respectively, when each tire-based unit 10 and the vehicle-body-based unit 20 receive the door unlock signal transmitted from the keyless transmitter 61, respectively, and detection is made that the occupant is going to get in the vehicle, transmission and reception of the air pressure signals are enabled at least one time between the tire-based unit 10 and the vehicle-body-based unit 20. The occupant can be promptly provided with notification of the status of the tire pressure when the occupant gets in the vehicle. When an abnormality occurs in the tire pressure, the occupant can be urged to take some counter measure prior to starting up the engine to actually run the vehicle.

Also, the vehicle-body-based unit 20 may be structured such that when the control section of the keyless entry system, that is, the keyless entry system control section 45, that outputs the keyless entry operation signal when the keyless receiver receives the door unlock request signal from the keyless transmitter 61, is connected to the CPU 23 of the vehicle-body-based unit 20, the low power consumption mode of the vehicle-body-based unit 20 is cancelled to render the air pressure signal receiver circuit 21 operative when the keyless operation signal is applied from the keyless entry control section 45 to the CPU 23. With such a structure being adopted, the low power consumption mode of the vehicle-body-based unit 20 is enabled to be cancelled in conjunction with each tire-based unit 10 when the door unlock request signal is transmitted from the keyless transmitter 61 for thereby permitting transmission and receiving of the air pressure signal to be appropriately performed between these component parts without the provision of the second keyless signal receiver circuit 63 in the vehicle-body-based unit 20.

What is claimed is:

1. A tire pressure monitoring system comprising:
   an on-board detection unit configured to transmit a detection signal indicative of the presence of an occupant entering a vehicle;
   a vehicle-body-based unit configured to receive the detection signal and transmit a transmission request to receive at least one air pressure signal indicative of tire pressure of the vehicle; and
   at least one tire-based unit configured to receive the transmission request, measure the tire pressure and transmit the air pressure signal.

2. The tire pressure monitoring system of claim 1, wherein the tire-based unit comprises:
   an air pressure signal transmission circuit configured to transmit the air pressure signal;
   a transmission request receiver circuit configured to receive the transmission request; and
   an air pressure sensor configured to measure the tire pressure.

3. The tire pressure monitoring system of claim 2, wherein the tire-based unit comprises:
   an acceleration sensor configured to detect the vehicle being in a parked state; and
   a control portion configured to shift to a low power consumption mode from a normal operation mode when the vehicle is parked.

4. The tire pressure monitoring system of claim 3, further comprising:
   an air pressure change detecting circuit configured to detect fluctuation in the tire pressure,
   wherein the control portion is configured to cancel the low power consumption mode when the air pressure change detection circuit detects a rapid increase in the tire pressure exceeding a given range.

5. The tire pressure monitoring system of claim 1, further comprising:
   a notification unit configured to notify the occupant as to a condition of the tire pressure,
   wherein the on-board detection unit is configured to prepare and transmit notification information indicative of the condition based on the air pressure signal to the notification unit.

6. The tire pressure monitoring system of claim 1, wherein the vehicle-body-based unit is configured to receive the air pressure signal when the vehicle-body-based unit receives at least one of an ignition signal and an accessory signal.

7. The tire pressure monitoring system of claim 1, wherein the vehicle-body-based unit is a door sensor configured to transmit a door signal in conjunction with opening and closing of a door of the vehicle.

8. The tire pressure monitoring system of claim 1, wherein the vehicle-body-based unit is a door lock circuit configured to transmit a door unlock detection signal in conjunction with an unlocked door of the vehicle.

9. The tire pressure monitoring system of claim 1, wherein the vehicle-body-based unit is a seat load sensor configured to transmit an on-seat detection signal upon detection of load applied to the seat of the vehicle.

10. The tire pressure monitoring system of claim 1, wherein the vehicle-body-based unit is an in-compartment occupant detection sensor configured to detect the presence of the occupant.

11. The tire pressure monitoring system of claim 1, further comprising:
a keyless transmitter configured to transmit a door unlocked request signal operating to unlock a door of the vehicle,
wherein the tire-based unit comprises a first keyless signal receiver circuit configured to transmit the air pressure signal when the first keyless signal receiver circuit receives the door unlocked request signal.

12. The tire pressure monitoring system of claim 1, further comprising:
a keyless transmitter configured to transmit a door unlocked request signal operating to unlock a door of the vehicle,
wherein the vehicle-body-based unit comprises a second keyless signal receiver circuit configured to receive the air pressure signal when the second keyless signal receiver circuit receives the door unlocked request signal.

13. The tire pressure monitoring system of claim 1, wherein each of a plurality of tire-based units comprises a transmission timing control circuit configured to control a timing to transmit the air pressure signal at times different from each other.

14. The tire pressure monitoring system of claim 1, wherein the vehicle-body-based unit comprises each of a plurality of air pressure signal receiver circuits configured to receive the air pressure signals, respectively.

* * * * *